United States Patent [19]

Fontanes et al.

[11] 4,063,040

[45] Dec. 13, 1977

[54] HIGH SPEED MULTIPLEXER AND DEMULTIPLEXER FOR PULSE CODE CHANNELS

[75] Inventors: Sylvain Fontanes; Daniel Forster, both of Chatou, France

[73] Assignee: Compagnie Europeenne de Teletransmission (C.E.T.T.), Chatou, France

[21] Appl. No.: 744,048

[22] Filed: Nov. 22, 1976

[30] Foreign Application Priority Data

Nov. 25, 1975 France .............................. 75.36004

[51] Int. Cl.² .............................................. H04J 3/04
[52] U.S. Cl. .............................. 179/15 A; 179/15 AF; 179/15 BS
[58] Field of Search ............ 179/15 A, 15 AF, 15 BS, 179/15 BL

[56] References Cited

U.S. PATENT DOCUMENTS

| | | | |
|---|---|---|---|
| 3,569,631 | 3/1971 | Johannes | 179/15 AF |
| 3,571,516 | 3/1971 | Ohyama | 179/15 BS |
| 3,689,697 | 9/1972 | Smith | 179/15 BS |
| 3,872,257 | 3/1975 | Bleickardt | 179/15 BS |

OTHER PUBLICATIONS

Review of the Electrical Communication Laboratories; vol. 20, No. 9-10; "An Experimental Broadband PCM Multiplexer-Demultiplexer" by Kozuka.
Proceedings of the IEEE 1972 on Communications; "High Speed up-to-400/800 Mb/S Digital Multiplexers" by Kawashima et al.

Primary Examiner—David L. Stewart
Attorney, Agent, or Firm—Cushman, Darby & Cushman

[57] ABSTRACT

For multiplexing 6 binary channels for example, two transcoders are respectively fed by the groups of input channels A, B, C and D, E, F in each of which is inserted a locking and identification word. Two three-channel frames in intermediate ternary form are thus obtained. Conversion into definitive ternary code (moment +, O, −) takes place at the same time as the interlacing, moment by moment, of the two three-channel frames. The demultiplexer groups the moments pertaining to one and the same three-channel frame for transcoding. The system allows high speed multiplexing.

8 Claims, 4 Drawing Figures

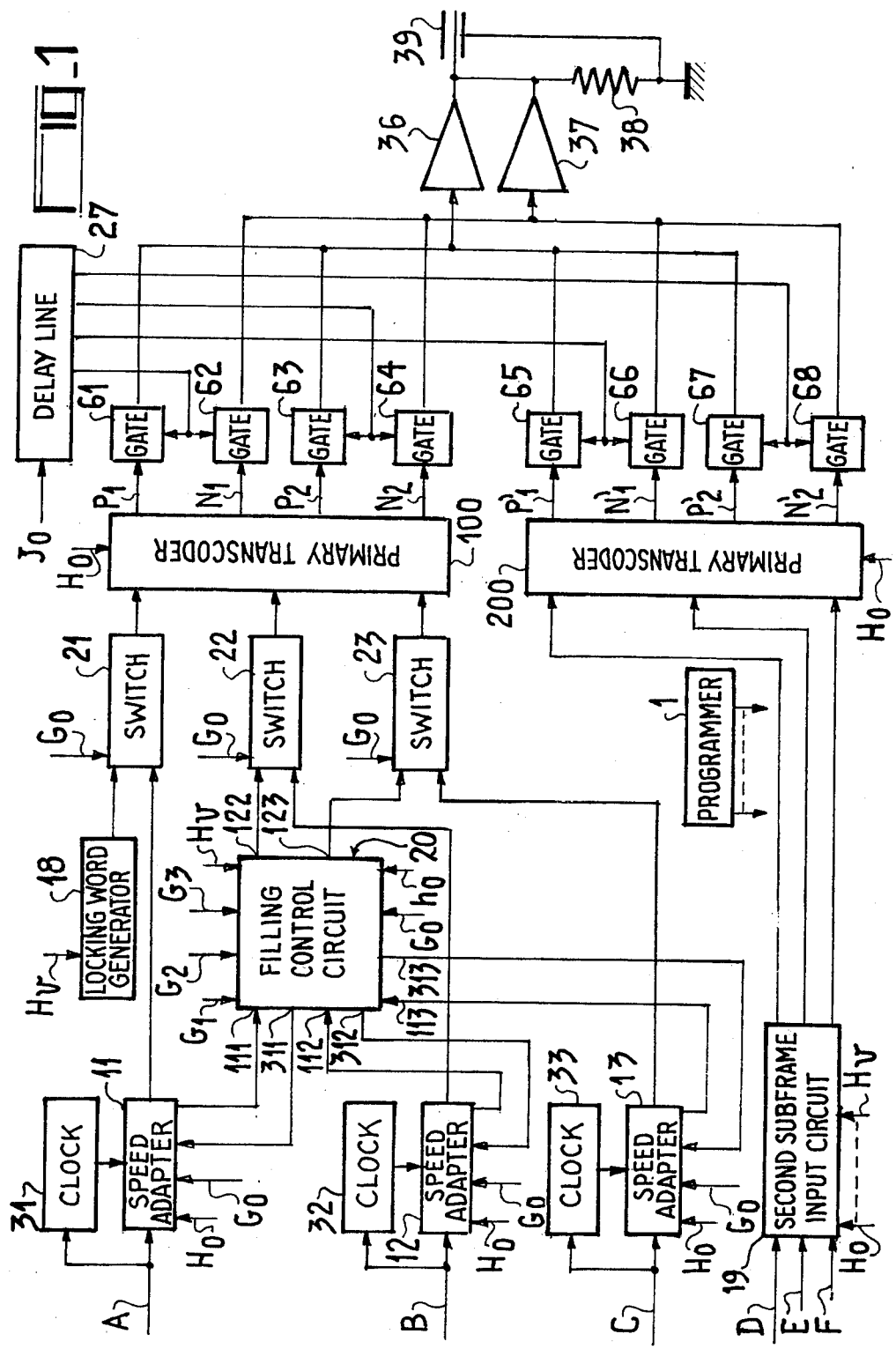

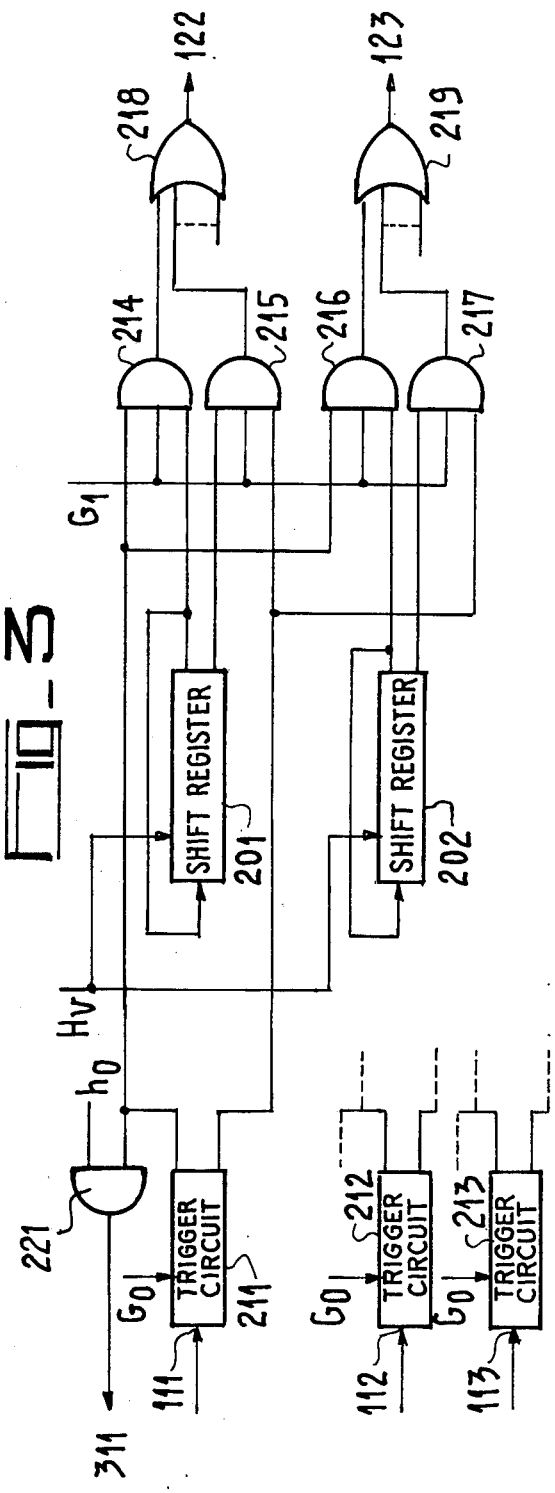

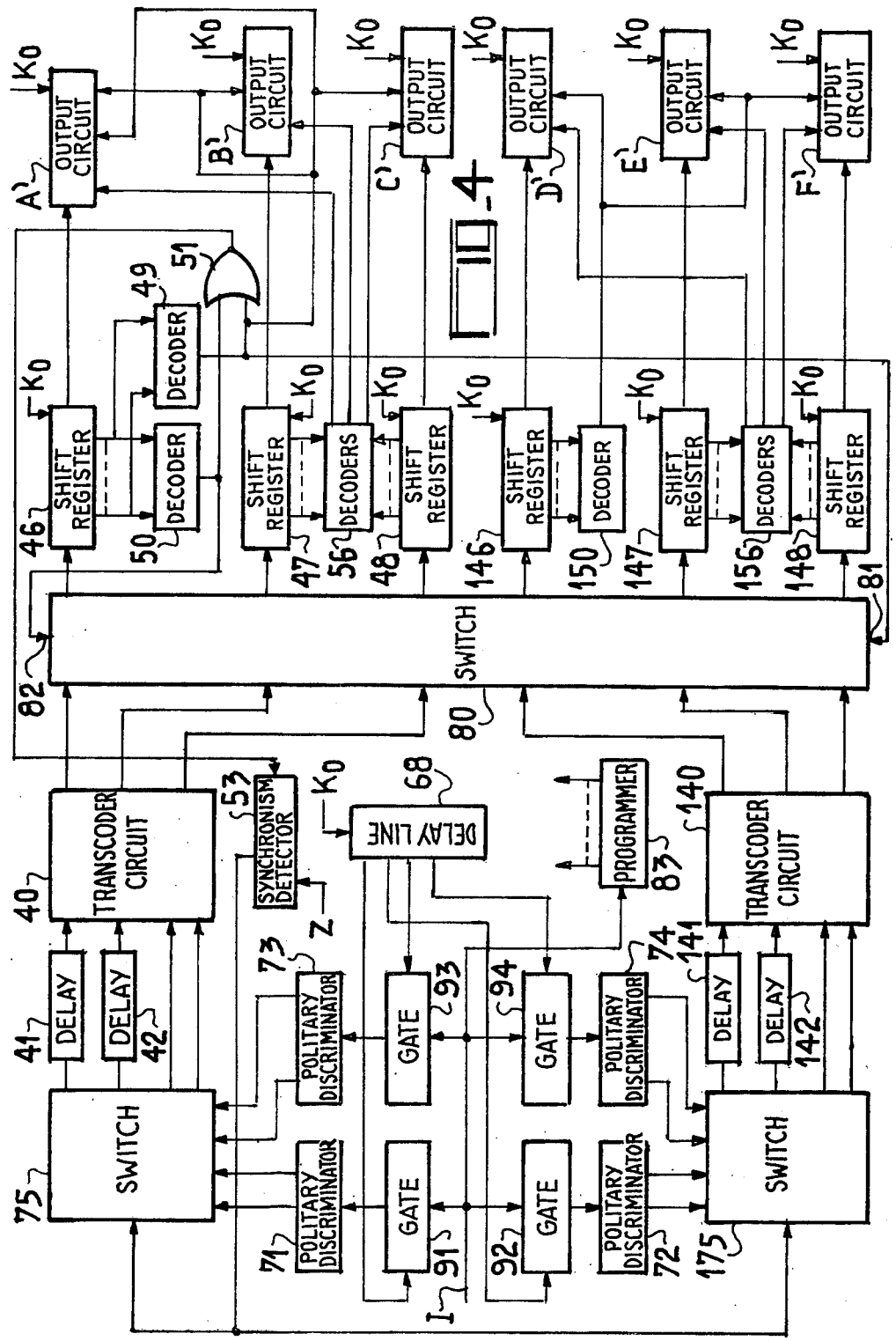

HIGH SPEED MULTIPLEXER AND DEMULTIPLEXER FOR PULSE CODE CHANNELS

This invention relates to a multiplexer and a demultiplexer for multiplexing $3n$ binary pulse code channels ($n>1$), generally telephone channels, in particular, for high speed multiplexing capable of reaching a global binary input flow of as high as, for example, 800 megabauds.

Flows as high as these present particular problems.

In the proposed system, this problem is resolved in particular by a transcoding operation in a ternary code with three moments or levels which takes place at the same time as the multiplexing operation so as to avoid the first problem presented by a transcoding operation effected on a binary channel multiplexed with an equally a highly rapid binary flow, or the complication of hardware which would be caused by a transcoding operation effected on each of the incoming channels. This solution leads to a collection of frames each comprising three channels, these frames being subsequently multiplexed with one another to form a complete frame if $n>1$.

According to the invention, there is provided a multiplexer for receiving $3n$ coded binary channels forming $n$ groups of three channels, $n$ being a positive integer, and delivering successive corresponding time multiplex frames, said multiplexer comprising: means for, before the forming of each frame, inserting the bits of a locking word among the bits of each group of channels; $n$ transcoding arrangements for transcoding said $n$ groups of channels respectively, each transducing arrangement being designed for delivering successive ternary three-channel frames in which successive pairs of ternary moments each translate three bits respectively belonging to the three channels of the group transcoded by this transcoding arrangement; and, if $n$ is greater than 1, further means for time multiplexing the three-channel frames delivered by said $n$ transcoding arrangements into resultant $3n$ channel frames in which the moments originating from one and the same three-channel frame are equidistant.

According to the invention, there is further provided a demultiplexer adapted for co-operating with a multiplexer as defined hereinabove said demultiplexer comprising: means for receiving successive frames, each formed by a succession of ternary moments; $2n$ channels forming $n$ pairs each comprising first and second channels; sampling means for cyclically directing the ternary moments of each frame to said $2n$ channels, first to the first channels of said $n$ pairs, and then to the second channels of said $n$ pairs, so that each pair of channels receives moments separated by $(n-1)$ other moments; $n$ transcoding arrangements each having 3 binary outputs, said $n$ transcoding arrangements being respectively fed by said $n$ pairs of channels and connected in the same manner to the first and second channels of said $n$ pairs respectively; a two-state switching arrangement for permutating the part played by the first and second channels of each pair relatively to the transcoding arrangement to which this pair is connected; detecting means coupled for receiving the output signals from at least one binary output of at least one of said transcoding arrangements for detecting at least one predetermined locking word; and means controlled by said detecting means for actuating said switching arrangement upon no locking word having been detected by said detecting means in the course of a time interval exceeding a predetermined time interval.

The invention will be better understood and other features thereof will become apparent from the following description in conjunction with the accompanying drawings, wherein:

FIG. 1 is a block diagram of one embodiment of a multiplexer according to the invention;

FIG. 2 is an explanatory diagram;

FIG. 3 illustrates in detail a circuit of the type shown in FIG. 1;

FIG. 4 is a block diagram of one embodiment of a demultiplexer adapted to co-operate with the multiplexer shown in FIG. 1.

The invention will be described with reference to the multiplexing of six binary channels at 140 megabauds, these channels being plesiochronic, i.e. the binary flows of the six multiplexed channels are substantially equal but not exactly (140 megabauds being their nominal frequency).

The ternary code used, formed by moments with three levels, $+$, $-$ and 0, enables a sequence of three bits to be identified by one group of two moments, the group of two moments 00 remaining unused.

On the other hand, it will be recalled that, in pulse code multiplexing with plesiochronic input channels, a binary flow equal to the maximum flow which can be produced in practice by the variation of clocks, etc., is attributed to each channel. In addition, provision has to be made for the need to accommodate the auxiliary bits such as those used for frame locking or start. This leads to a multiplexing frequency $F_o$ which is higher than the nominal frequency of the channels to be multiplexed. To each time-division channel there is assigned a certain number of predetermined time-division positions, generally one per frame, into which a filling bit may be introduced to keep the output flow at the frequency $F_o$. In addition to the so-called frame start or locking, the beginning of a frame should contain, for each time-division channel, an indication of the fact that the position reserved for the filling has in fact received a filling symbol, often known as a "justification" symbol (a filling bit in the case of a binary transmission) and not an information symbol. This information is given with redundancy in view of the consequences of an error in this respect.

It will be assumed that this requires one word of six bits per channel and that correct locking is obtained with a word of 9 bits.

Since there is no circuit capable of effecting a logic operation at a maximum speed of the order of 900 megabits per second, the principle which consists in effecting, as far as is possible, the complex logic treatments at speeds corresponding to those of the incident channels, will be used here. The effect of this is to transfer certain functions either before multiplexing or after demultiplexing.

This being the case, FIG. 1 shows the six input channels A, B, C, D, E, F having a nominal flow of 140 megabauds, the frequency $F_o$ being fixed at a value beyond the maximum permitted limit for the speed of the channels A, B, C, D, E, F.

These six channels are divided into two groups of three channels A, B, C and D, E, F, by means of which two synchronous frames with three channels, in a ternary code, will be formed. These three-channel frames will then be inserted into one another to form a complete frame with six channels and, accordingly, will be referred to in short as subframes.

FIG. 2 shows at S the beginning of the first of the subframes in binary form. It comprises 27 auxiliary bits of which 9 ($V_1$ to $V_9$) are for the identification and locking of subframes, $V_1$ being the first bit and each of the others being separated from the preceding bit by two bits. The remaining 18 auxiliary bits are used successively, bit by bit, for forming the filling indication word of the first channel (bits $R_1$ to $R_6$), the second channel (bits $R'_1$ to $R'_6$) and the third channel (bits $R''_1$ to $R''_6$). After these 27 auxiliary bits come three positions $R_o$, $R'_o$, $R''_o$ which may be occupied by an information bit or by a filling bit, the interlaced information bits then following one another in conventional manner for the three channels so as to form a subframe with a total of 750 bits.

However, in the arrangement according to the invention, these subframes do not appear in the binary form. The auxiliary bits V and R are inserted in binary form into the channels A, B and C, i.e. the first of each group of three into channel A, the second into channel B and the third into channel C, as indicated at A, B and C in FIG. 2. The auxiliary bits and the information bits of the three channels are thereafter transcoded at the same time as they are multiplexed.

In FIG. 2, the clock times $T_o = 1/F_o$ are represented by vertical lines.

The second subframe has the same structure as the first, but a different locking word allowing identification.

After the indicated processing, the channels A, B and C are directed to a primary transcoder 100 which supplies the first subframe in intermediate ternary form, while the channels D, E, F are directed to a primary transcoder 200 which supplies the second subframe in intermediate ternary form.

Since the feed circuits of the two transcoders are identical, apart from the fact that the locking words introduced into the two subframes are different, only the first will be described.

The three input channels A, B, C respectively feed the inputs of the synchronisation circuit of three clocks 31 to 33 which supply pulses $H_1$ to $H_3$ coinciding respectively with the middle of the incident bits.

The channels A, B and C feed three speed adapter circuits 11 to 13 which respectively receive the pulses $H_1$ to $H_3$ and pulses $H_o$ of frequency $F_o$ supplied by a programmer 1.

In order not to overload the drawing, the connections between the programmer and the synchronised elements have not been shown, but the inputs of the synchronised elements are denoted by the same symbols as the pulses which they receive.

It will be recalled that a speed adapter comprises a buffer register which is loaded at the frequency of the incident bits and read at the frequency imposed by the multiplexing operation, in this case $F_o$. On the other hand, reading has to be interrupted to allow the transmission of the auxiliary bits. Accordingly, the adapters also receive from the programmer a rectangular signal defining the beginning-of-frame time intervals $G_o$ with a duration of 9 $T_o$ with $T_o = 1/F_o$, corresponding to the transmission of the 27 auxiliary bits, and the complementary intervals G.

In each speed adapter, a phase comparison circuit receives the writing control signal $H_i$ ($i = 1, 2, 3$) and the reading control signal $H_o$. When the phase difference becomes critical, the phase comparator supplies a rectangular signal which is received by a filling control circuit. As long as this rectangular signal exists, the filling control circuit supplies at the beginning of a frame the redundant coded word indicating that filling has taken place (in the opposite case it would supply the redundant coded word indicating that filling has not taken place) and, on the other hand, controls this filling by supplying a stopreading signal with a duration of 1 bit at the opportune moment, i.e. at the moment where the time position of the channel provided for the filling intervenes.

Now that these general observations have been recalled to mind, the speed adapters of the arrangement described operate in the usual manner, although their respective filling control circuits operate in combination for insertion of the filling indication bits. The corresponding circuit is shown at 20. At its inputs 111, 112 and 113, it receives the rectangular signals of the speed adapters and, for each of them, operates in the usual way to stop reading in response to pulses supplied by its outputs 311, 312 and 313 to the adapters 11, 12 and 13, respectively.

To this end, the circuit 20 receives the rectangular signal $G_o$, indicating the beginning of a subframe, of duration 9 $T_o$ and the tenth pulse $H_o$, denoted $h_o$, of the subframe period corresponding to the reading of the first information bit of each channel in the absence of a filling bit.

In this case, however, the circuit 20 has to perform the additional function of distributor (according to FIG. 2) for the filling indication bits and, to this end, it also receives from the programmer, at the beginning of each subframe, the train, denoted $H_r$, of the first nine pulses $H_o$, and the rectangular signals $G_1$, $G_2$ and $G_3$ covering respectively the durations 0 to 3 $T_o$, 3 $T_o$ to 6 $T_o$ and 6 $T_o$ to 9 $T_o$ from the beginning of the subframe period.

The circuit 20 is illustrated in detail in FIG. 3.

It comprises three type D trigger circuits 211, 212, 213 whose signal inputs are, respectively, the inputs 111, 112 and 113 of the circuit receiving the above-mentioned rectangular signals. The clock inputs of the bistable circuits 211, 212 and 213 receive the rectangular signals $G_o$ and are sensitive to the front edges thereof.

The first of two shift registers 201 and 202 contains the bits $R_1$, $R_3$ and $R_5$, while the other contains the bits $R_2$, $R_4$ and $R_6$. These two shift registers are looped back on themselves by their output Q (non-inverted). The normal output Q and the inverted output $\overline{Q}$ of the register 201 are respectively connected to the first inputs of two three-input AND-gates 214 and 215. The second inputs of the gates 214 and 215 are respectively connected to the output Q and to the output $\overline{Q}$ of the bistable trigger circuit 211. Finally, the two gates receive the rectangular signals $G_1$ at their third inputs, while the clock inputs of the two registers receive the pulse trains $H_r$.

At the beginning of a subframe, the trigger circuit 211, assumes the state 1 or 0, depending on whether or not the speed adapter 11 has to insert a filling bit in the course of this subframe. If this is the case, the effect of the first three pulses of the train $H_r$ is to cause the bits $R_1$, $R_2$ and $R_3$ to appear successively at the output of the gate 214. In the opposite case, it is the gate 215 which is authorized by the bistable circuit 211 and supplies the bits $\overline{R}_1$, $\overline{R}_3$ and $\overline{R}_5$ forming part of the word complementary to that which indicates the presence of a filling bit. An OR-circuit 218, of which the inputs are connected to the outputs of the gates 214 and 215, has an output 122 which is the output of the circuit 20 for the insertions of auxiliary bits into the channel B. For channel C, there corresponds to this output 122 an output 123 which is the output of an OR-gate 219.

The register 202 is arranged in the same way as the register 201 with AND-gates 216 and 217 and the OR-gate 219 corresponding to the gates 214, 215 and 218. The only difference is that it contains the bits $R_2$, $R_4$ and $R_6$ and not the bits $R_1$, $R_3$ and $R_5$.

For the insertion of the bits of the filling indicating words relating to channels B and C, respectively, each trigger circuit 212 and 213 controls an arrangement (not shown) similar to that described for the trigger circuit 211, with the difference that the AND-gates corresponding to the gates 214 and 217 are authorised by the rectangular signal $G_2$, in regard to the arrangement controlled by the trigger circuit 212, and by the rectangular signal $G_3$ in regard to the arrangement controlled by the trigger circuit 213. The gates 218 and 219 with 6 inputs are common to the arrangements controlled by the three trigger circuits. The relative phases of the rectangular signals and the pulses $H_0$ are adjusted, for example by means of delay elements, in such a way that each of the gates, such as the gates 214 to 217, allows through the three required bits. However, the consequences of any slight overlap of bits at the inputs of the OR-gates 218 and 219 will be eliminated in the manner described hereinafter. It is pointed out that it is possible to apply the same clock pulses to all the registers, because of the gate signals $G_1$, $G_2$ and $G_3$ and since, after three clock pulses, each register returns to its initial state.

For the stop-reading signal, the trigger circuit 211 controls through its output Q an AND gate 221 which receives the pulse $h_0$. The trigger circuits 212 and 213 deliver the stop-reading signal to the adapter circuits 12 and 13 in the same way, the corresponding gates not having been shown.

A circuit 18 (FIG. 1) formed, for example, by a nine-stage shift register looped back on itself contains the word for locking the subframe and receives from the programmer the group $H_r$ of nine advance pulses $H_o$ which cause it to supply the corresponding bits at the opportune moments. The output of the circuit 18 and the output of the speed adapter 11 are connected by a switch 21 to the first input of the transcoder 100. The circuit 20 synchronised in the manner described inserts the filling indication bits into the channels B and C and, to this end, its outputs 122 and 123 are connected to two switches 22 and 23 of which the second inputs are respectively connected to the outputs of the adapters 12 and 13. The switches 21, 22 and 23 are controlled by the rectangular signals $G_o$ in such a way as to direct the auxiliary bits to their outputs at the beginning of each frame and the bits emanating from the adapters for the remainder of the time. The outputs of the switches 21, 22 and 23 are connected to the inputs of the circuit 100, or primary transcoder, which supplies a three-channel frame in an intermediate ternary form.

The input circuit fed by the channels D, E and F is globally represented by a block 19 which, in addition, receives the synchronisation signals $H_o$, $G_o$, $G_1$, $G_2$, $G_3$, $h_o$ and $H_r$. Its three outputs are connected to the three inputs of a second primary transcoder 200.

Accordingly, each transcoder is fed at the frequency of the pulses $H_o$ and, for each of them, supplies the two moments corresponding to its three input bits, recording taking place in each transcoder under the control of pulses $H_o$ which are slightly retarded relative to the preceding pulses $H_o$ so that recording takes place in the transcoder at moments where there is no risk of two bits partially overlapping one another.

Each primary transcoder comprises an elementary logic circuit which acts on the three bits applied simultaneously to its first, second and third inputs, respectively, and which, according to an agreed code, supplies for each possible structure of three input bits (8 possible combinations) first and second pairs of bits, each pair being capable of assuming one of the three forms 1-0, 0-0 and 0-1 intended to be converted into moments +, 0 and −, respectively. The first bits of each pair feed amplifiers delivering a positive signal for a bit 1, while the second bits of each pair feed amplifiers delivering a negative signal for a bit 1. If the outputs of the amplifiers of the first bit of the first pair, of the second bit of the first pair, of the first bit of the second pair and of the second bit of the second pair are denoted $P_1$, $N_1$, $P_2$ and $N_2$, respectively, it can be seen that the three possible values of the $i^{th}$ moment of each pair ($i = 1$ or 2) are coded in the following manner by two voltages:

|  | $P_i$ | $N_i$ |
|---|---|---|
| "+" moment | voltage + | voltage 0 |
| "0" moment | voltage 0 | voltage 0 |
| "−" moment | voltage 0 | voltage − |

Multiplexing of the two subframes and conversion of the intermediate code into the final code are carried out as follows. The pairs of outputs $P_1$ - $N_1$ and $P_2$ - $N_2$ of the first primary transcoder and the corresponding pairs of outputs $P'_1$ - $N'_1$ and $P'_2$ - $N'_2$ of the second primary transcoder are successively sampled by means of four pairs of fast analog gates 61-62, 63-64, 65-66, and 67-68, these pairs being respectively unblocked in the order of the inputs $P_1$ - $N_1$, $P'_1$ - $N'_1$, $P_2$ - $N_2$, $P'_2$ - $N'_2$ by means of pulses $J_1$, $J_2$, $J_3$, $J_4$ supplied by a delay line 27 fed by an output of the programmer 1 supplying sampling pulses $J_o$ of frequency $F_o$, the pulses $J_1$, $J_2$, $J_3$ and $J_4$ of duration $T' = T_o/4$ appearing consecutively at the outputs of the delay line so that the four pairs of outputs are sampled during the time $T_o = 4 T'$ in the course of which the transcoder supplies the two pairs of voltages corresponding to a given group of three input bits, the phase of the pulse $J_0$ being such that pulse $J_1$ occupies the first quarter of this time.

The outputs of the gates 61, 63, 65 and 67, which supply positive or zero voltages, are connected to the input of a positive pulse amplifier 36, while the outputs of the gates 62, 64, 66 and 68, which supply negative or zero voltages are connected to the input of a negative pulse amplifier 37, the two amplifiers supplying a common resistor 38 of which the earth terminal is connected to the outer conductor of a coaxial cable 39 and its other terminal to the inner conductor of this cable.

FIG. 4 illustrates the corresponding demultiplexer.

The input signals received at the input I are applied to a control input of a programmer 83 comprising a clock which is phase-controlled by these input signals.

The programmer 83 supplies pulses $K_o$ of the same duration $T' = 1/F = t_o/4$ as the moments and in phase with them, but of frequency $F_o = F'/4$; the pulses $K_o$ are applied to a delay line 68 which supplies for each of them four pulses $K_1$, $K_2$, $K_3$, $K_4$ of duration T', coinciding respectively with four successive moments of the input signals. The input signal is applied in parallel to the inputs of four analog gates 91 to 94 respectively released by the pulses $K_1$ to $K_4$, these four analog gates thus supplying four series of moments $M_1$ to $M_4$.

The outputs of the four gates 91 to 94 are connected to the inputs of four polarity discriminators 71 to 74 each with two outputs supplying the intermediate code 10, 00 or 01 in the form of logic level according to whether its input signal is positive, zero or negative. Each discriminator is formed by two amplifiers fed in parallel, one amplifying the positive voltages and the other, with polarity inversion, the negative voltages, the outputs of the two amplifiers forming the two outputs of the discriminator. On the other hand, a conventional capacitor device is included in each amplifier so as to bring the duration of the non-zero input signals of the discriminators from $T$ to $4\ T = T_o$.

The two outputs of the discriminator 71 and the two outputs of the discriminator 73 are connected to the four inputs of a switch 75 which, in its first state, connects the outputs of the discriminator 71 to the first two inputs of a logic transcoding circuit 40 through two delay elements 41 and 42 which impart a delay of 2 $T$, and the outputs of the discriminator 73 directly to the other two inputs of the logic circuit 40. In its second state, the switch 75 connects the outputs of the discriminator 73 to the delay elements and the outputs of the discriminator 71 directly to the last two inputs of the circuit 40.

Since the moments of the two subframes are interlaced, it is certain that the discriminators 71 and 73 will supply moments of one and the same subframe, although it is not known which of the two supplies the first moment of the pairs. If it is the discriminator 71, the effect of the switch 75 in its first state will be simultaneously to direct the two moments of one and the same pair to the circuit 40. In the opposite case, this same result is obtained if the switch 75 is in its second state.

The logic circuit converts the four logic levels issuing from the polarity discriminators into one group of three simultaneously available bits. However, there is no point to this operation unless the switch 75 is in the correct position. The three outputs of the logic circuit 40 are connected to the first three inputs of a switching device 80.

The outputs of the discriminators 72 and 74 (72 performs the function of 71 and 74 the function of 73) feed an analogous arrangement terminating in a logic transcoding circuit 140, the elements of this arrangement being denoted by numerals increased by 100 relative to those which denote the corresponding elements of the first arrangement.

The switches 75 and 175 are controlled in synchronism and their control circuit is such that they change state for each pulse received at their control input.

It can readily be verified that, for correct operation, the switch 175 should be in the same state as the switch 75.

The three outputs of the circuit 140 are connected to three other inputs of the switching device 80.

The switching device 80 comprises 6 outputs respectively connected to the inputs of 6 27-stage shift registers 46, 47, 48, 146, 147 and 148, of which the clock inputs receive advance pulses $K_o$ of frequency $F_o$ from the programmer 83. In order to eliminate the consequence of imperfect synchronisation of the bits at the inputs of the transcoding circuits 40 and 140, the pulses $K_o$ applied to the registers are phase-shifted by $T/2$ relatively to the pulses applied to the delay line 68.

The switching device 80 has two states. In its first state, it connects the registers 46, 47, 48 to the first, second and third outputs of the logic circuit 40, and the registers 146, 147 and 148 to the first, second and third outputs of the logic circuit 140. In its second state, these connections are reversed, the registers 46 to 48 being fed by the circuit 140 and the registers 146 to 148 by the circuit 40.

The register 46 fed by the first output of the switch 80 feeds two decoders 49 and 50 respectively decoding the locking words of the first subframe and second subframe.

If the switches 75 and 175 are in the correct state, the first output of the circuit 40 is of necessity the first channel of the first subframe of the first channel of the second subframe and one or other of the two decoders will supply a pulse at a given moment. The outputs of the two decoders are connected to two inputs of an OR-gate 51 which is applied to conventional synchronism detector 53 which, on the other hand, receives a brief signal at half the frame frequency Z from the programmer 83 and supplies an output pulse for the $n^{th}$ pulse Z if no pulse has been received from the OR-gate 51 since the $(n-1)^{th}$ pulse Z. These pulses are applied to the control inputs of the switches 75 and 175 which are thus brought rapidly into the correct position if this was not the case.

The switch 80 is used in such a way that the registers 46, 47 and 48 respectively receive the demultiplexed channels A, B and C, while the registers 146, 147 and 148 receive the demultiplexed channels D, E and F such as supplied to the input of the primary transcoders of the multiplexer.

The outputs of the six shift registers 46 to 48 and 146 to 148 respectively feed the output circuits A', B', C' D', E' and F' corresponding to the input channels A, B, C and D, E, F, in which the locking words, filling indication words and filling bits are eliminated in the usual way.

The switch 80 comprises two control inputs 81 and 82 respectively connected to the outputs of the decoders 49 and 50. A pulse received from the decoder 49 places the switch 80 in its first state, unless this was already the case, while a pulse received from the decoder 50 places the switch 80 in its second state, unless this was already the case, so that a pulse supplied by one or other of the decoders places the switch 80 in the state for which the registers respectively receive the signals of the channels with which they are associated.

In order not to overload the drawing, a block 56 globally represents three decoders fed by the shift registers 47 and 48 which decode the effective filling indication words (as opposed to non-filling), the corresponding pulses appearing at three outputs corresponding to the channels supplied by the first, second and third outputs of the circuit 40.

Since the filling bits are eliminated at the same time as the auxiliary bits in the output circuits A', B', C', D', E' and F', these pulses are respectively delivered to the channels A', B' and C', as are the output pulses of the decoder 49.

The corresponding circuit, with reference numerals increased by 100, supplies the pulses indicative of effective filling for the three output channels of the circuit 140.

On the other hand, the register 146 feeds a decoder 150 for the locking word of the second subframe of which the output pulses are supplied to the circuits D', E' and F'.

The six output circuits A' to F' receive the same pulses of frequency $F_o$ as those which are applied to the preceding registers.

Naturally the invention is by no means limited to the multiplexing of 6 channels because $n$ may be any number. If $n$ is greater than 2, these channels are distributed into $n$ groups.

This being the case, $n$-subframes may thus be formed in the same way as the two subframes of the present invention, and the frame is formed by the interlacing of $n$-subframes in ternary form.

At the receiving end, sampling is carried out by means of pulses $K_1$ to $K_n$ and the moments emanating from the pulses $K_i$ and $K_{i+n}$ ($i = 1, 2 \ldots n$) and corresponding to one and the same subframe are associated together to feed pairs of polarity discriminators, such as 71 and 73 in FIG. 4, and the output circuits thereof, except that the delay elements impart a delay of $n$ T' instead of 2 T'. Assuming that the subframe locking words, which are at the same time used for identification, are still inserted in the first channel of each subframe, the register fed by the first output of one of the $n$-transcoders, such as 40, will feed N decoders which decode the identification words of the subframes and of which the output signals are combined by an OR-gate. The switching devices required for the output signal of the logic transcoding circuits are known to the person skilled in the art.

It is pointed out that the arrangement described above prevents certain critical elements from having to operate at high speed. It is only the sampling gates which operate at high speed in the demultiplexer. In addition, it is due to the brevity of the sampling pulses in the example in question that the switching operations were not carried out by switching the sampling pulses, although this could be done if the speeds are not too high.

The case where $n = 1$ leads to extremely simplified circuits which are obvious to the person skilled in the art. It is pointed out in particular that, during demultiplexing, there is in this case no switching which corresponds to that effected by the switching device 80 in FIG. 4.

The multiplexer and demultiplexer are of course capable of modification, irrespective of the value of $n$, in particular regarding the transcoding process and, if $n$ is greater than 1, the decoding circuit controlling the states of the switching device 80 (FIG. 4).

So far as the transcoding circuits 40 and 140 (FIG. 4) are concerned, the essential requirement is that the transcoding circuit should only operate while its four inputs are simultaneously and correctly fed by the coded ternary signals, or that its output signals should only be used when they emanate from a transcoding operation carried out on two coherent input signals.

The joint use of the extension of the signals in the polarity discriminators and of the delay imparted to two of the output channels of each switch 75 and 175 represents a preferred measure. An extension or a delay is sufficient provided that synchronisation precautions are taken for the operation of the transcoding circuit or for the transmission of its output signals.

Of course, the invention is not limited to the embodiments described and shown which were given solely by way of example.

What is claimed is:

1. A multiplexer for receiving $3n$ coded binary channels forming $n$ groups of three channels, $n$ being a positive integer, and delivering successive corresponding time multiplex frames, said multiplexer comprising: means for, before the forming of each frame, inserting the bits of a locking word among the bits of each group of channels; $n$ transcoding means for simultaneously transcoding said $n$ groups of channels respectively, each transcoding means being designed for delivering successive ternary three-channel frames in which successive pairs of ternary moments translate three binary bits respectively belonging to the three channels of the group transcoded by this transcoding means; and time multiplexing means for sequentially transmitting the values of each ternary moment delivered by said $n$ transcoding arrangements, the moments originating from a given three channel frame being equidistant.

2. A multiplexer as claimed in claim 1, wherein each of said transcoding means has three inputs respectively coupled to three channels, and first and second pairs of outputs, each pair having first and second outputs, for simultaneously delivering in coded form, respectively at said two pairs of outputs, the two moments of each of said successive pairs, a ternary moment being coded at a pair of outputs by the two voltages appearing at the first and second outputs of said pair, namely according to its value (i) a first non-zero voltage and a zero voltage (ii), or two zero voltages or (iii) a zero voltage and a second non zero voltage, said time multiplexing means comprising sampling means for sampling the voltage supplied by said outputs, the sampling being simultaneous for the outputs of a pair, and alternate for the two pairs, said multiplexer further comprising an amplifying means coupled to said sampling means, for delivering for each pair of simultaneous samples a positive, zero, or negative pulses according to whether the samples of this pair are samples of (i) said first non zero voltage and a zero voltage (ii) two zero voltages, or (iii) a zero voltage and said second non zero voltage.

3. A multiplexer as claimed in claim 2, wherein said two non-zero voltages are of opposite polarities and wherein said amplifying means comprises a first amplifier for receiving the samples of the voltages supplied by the first output of each pair and an second amplifier for receiving the samples of the voltages supplied by the second output of each pair, said amplifiers feeding a common load.

4. A multiplexer as claimed in claim 1, wherein said $3n$ inputs channels being plesiochronic, said first means are also for including the bits of the filling indication words for the three channels of each group among the bits of the three channels of this group.

5. A demultiplexer adapted for restoring $3n$ coded binary channels forming $n$ groups of three channels, $n$ being a positive integer, from successive corresponding multiplex frames, delivered by a multiplexer receiving said $3n$ coded channels, each frame being formed by a succession of ternary moments, said demultiplexer comprising:; $2n$ channels forming $n$ pairs each comprising first and second channels; sampling means for cyclically directing the ternary moments of each frame to said $2n$ channels, first to the first channels of said $n$ pairs, and then to the second channels of said $n$ pairs, to that each pair of channels receives moments separated by $(n-1)$ other moments; $n$ transcoding arrangements each having 3 binary outputs, said $n$ transcoding arrangements being respectively fed by said $n$ pairs of channels and connected in the same manner to the first and second channels of said $n$ pairs respectively; a two-state switching means for permutating the part played by the first and second channels of each pair relatively to the transcoding means to which this pair is connected; detecting means coupled for receiving the output signals from at least one binary output of at least one of said transcoding means for detecting at least one predetermined locking word; and means controlled by said detecting means for actuating said switching means upon no locking word having been detected by said detecting means in the course of a time interval exceeding a predetermined time interval.

6. A demultiplexer as claimed in claim 5, with $n$ greater than 1, further comprising $n$ groups of three output channels, and switching means controlled by said detecting means for connecting in a one-to-one relation the three binary outputs of said $n$ transcoding means respectively to the three channels of said $n$ groups of three output channels respectively.

7. A demultiplexer as claimed in claim 6, wherein said switching means are inserted between said binary outputs and said output channels, and wherein said detecting means are coupled to at least one of said output channels.

8. A demultiplexer as claimed in claim 5, wherein each channel comprises a polarity discriminator, having a pair of outputs, for converting each moment successively directed to this channel in a pair of output voltages, the polarity discriminators respectively inserted in the first and second channels of a pair of channels feeding a transcoding means, being hereinafter referred to as the first and second discriminators associated with this transcoding means; wherein each transcoding means has two pairs of inputs, each for coupling to the pair of outputs of a respective one of the discriminators associated with this means, and wherein said switching arrangement comprises $n$ switching devices for permutating the coupling of the two pairs of inputs of each one of said $n$ transcoding means respectively with the two discriminators associated with this transcoding means.

* * * * *